United States Patent [19]

Colonias

[11] Patent Number: 4,817,359
[45] Date of Patent: Apr. 4, 1989

[54] MULTIPLE WOOD TRUSS CONNECTION

[75] Inventor: Karen W. Colonias, Lafayette, Calif.

[73] Assignee: Simpson Strong-Tie Company, Inc., San Leandro, Calif.

[21] Appl. No.: 150,894

[22] Filed: Feb. 1, 1988

[51] Int. Cl.$^4$ .............................................. E04C 3/02
[52] U.S. Cl. ........................................ 52/643; 52/90; 52/648; 403/170; 403/232.1
[58] Field of Search .................... 52/81, 712, 713, 714, 52/715, 646, 643, 90, 648; 403/171, 170, 230, 232.1; 182/185, 224, 184

[56] References Cited

U.S. PATENT DOCUMENTS

| | | | |
|---|---|---|---|
| 936,007 | 10/1909 | Mauborgne | 182/185 |
| 1,114,336 | 10/1914 | Blomqvist | 182/224 |
| 2,711,917 | 6/1955 | Blu | 403/171 |
| 2,889,176 | 6/1959 | Thompson | 182/185 |
| 3,338,875 | 8/1967 | Tracy | 403/170 |
| 3,481,635 | 12/1969 | Tracy | 403/232.1 |
| 3,627,075 | 12/1971 | Enders | 248/248 |
| 4,291,996 | 9/1981 | Gilb | 403/232.1 |
| 4,551,957 | 11/1985 | Madray | 403/170 |
| 4,572,695 | 2/1986 | Gilb | 403/232.1 |
| 4,688,358 | 8/1987 | Madray | 403/171 |

OTHER PUBLICATIONS

Lumberlok catalog, showing the KCS and KFH connectors.

*Primary Examiner*—John E. Murtagh
*Attorney, Agent, or Firm*—James R. Cypher

[57] ABSTRACT

A connector for joining a wood member such as a hip truss and a second wood member such as a jack truss to a third wood member such as a girder truss. The connector is formed with a seat for receiving the bottom edges of the hip and jack truss, side members and tab members which respectively attach to the sides of the hip and jack trusses, and back members which attach to the carrier girder truss. The connector is constructed from a single sheet metal blank member and requires no welding. The hip and jack trusses intersect at an angle less than 90° and attach to the bottom chord of the carrier girder truss.

2 Claims, 4 Drawing Sheets

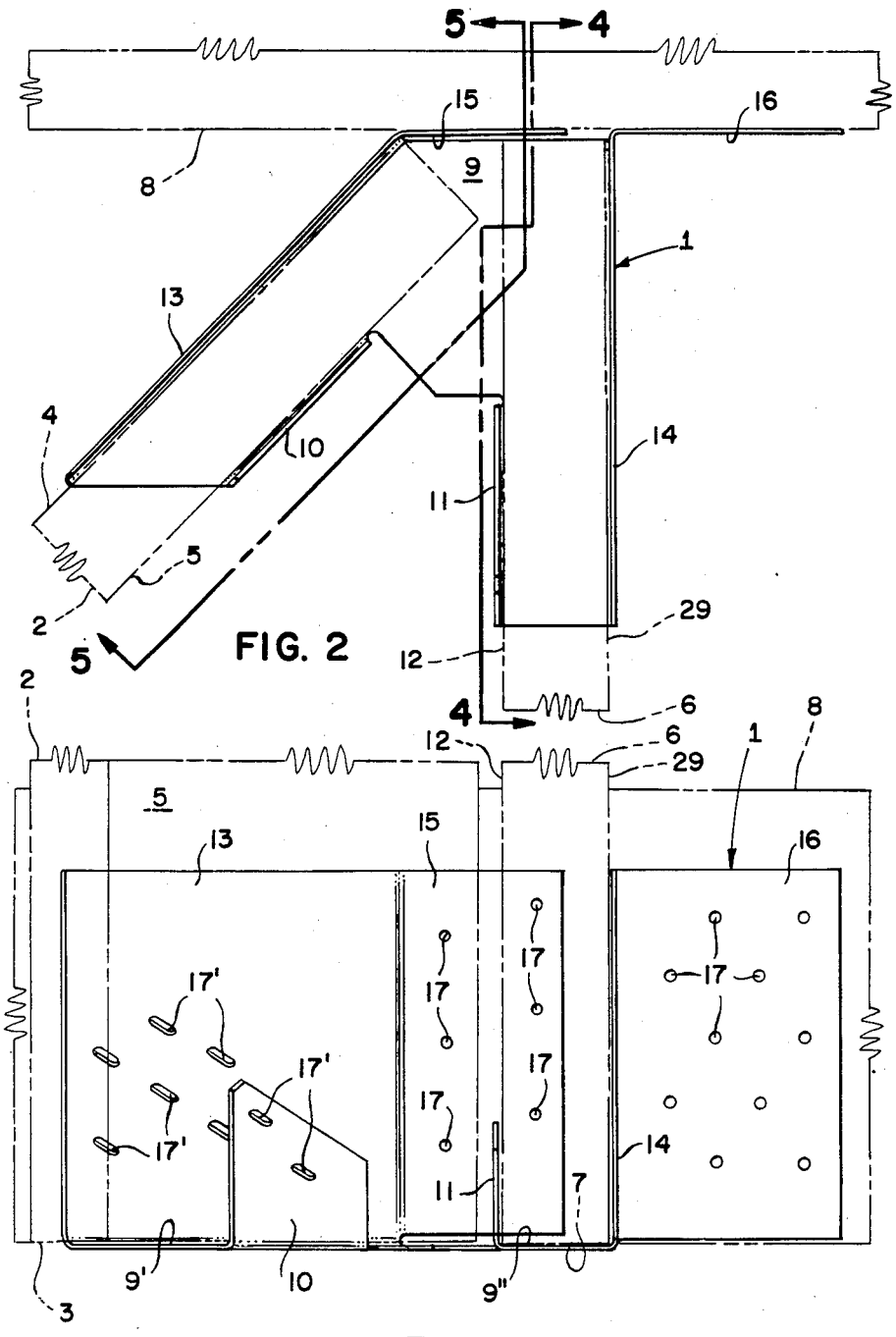

MULTIPLE WOOD TRUSS CONNECTION

BACKGROUND OF THE INVENTION

This invention relates to connectors which are used in the attachment of multiple wood trusses to a wood girder connected to a header member. The wood trusses intersect at an angle less than 90° and are used in constructing hip roofs in building structures, bracing or other multiple truss connections.

Prior connectors were constructed from heavy plates welded together on a custom basis by various fabricating iron shops. Traditional sheet metal connector fabricators have provided some of these custom made connectors but because welding is required and present solutions can not take advantage of high product methods, no cost effective way had been found of providing a standard connector for the building plated truss industry.

SUMMARY OF THE INVENTION

The connector of the present invention is constructed from a single sheet metal member and is primarily designed to connect two wood trusses intersecting at a 45° or other angle less than 90° to a carrier girder.

A secondary benefit is the fact that the identical connector may be used for connecting multiple solid sawn members which intersect at an angle other than a 90° angle.

An advantage of the present connector is that it requires no welding or painting.

A further advantage is that the connector of the present invention is significantly less expensive to make and install than previous welded connectors.

Another advantage is that the present connector provides greater resistance to truss overturn than present single member connectors.

A still further advantage is the fact that the present connector is connected to the carrier girder or header at locations closer to the point of load thereby permitting less bending of the connector and resulting in less relative movement of the trusses at their connection to the carrier girder or header.

Still another advantage is the fact that the construction of the present connector permits easier nailing of the connector.

BRIEF DESCRIPTION OF THE DRAWINGS

FIG. 2 is a top plan view of the connector shown in FIG. 1 with portions of the carried truss members and carrier girder shown in phantom line.

FIG. 3 is a front elevation view of the connector illustrated in FIG. 1 with portions of the carried wood truss members and carrier girder in phantom line.

DESCRIPTION OF THE PREFERRED EMBODIMENT OF THE INVENTION

Figure 1:
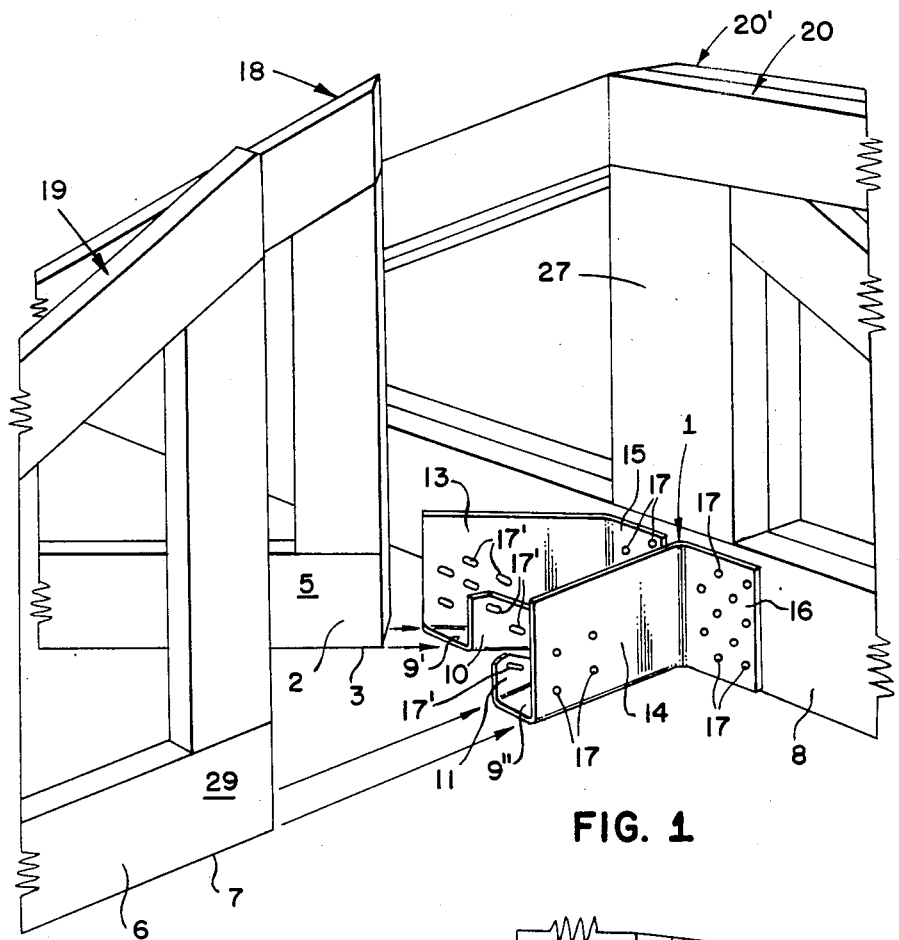
FIG. 1 is a perspective view of the connector of the present invention connected to a carrier girder illustrating two wood trusses withdrawn from the connector for purposes of clairity.
Figure 1A:
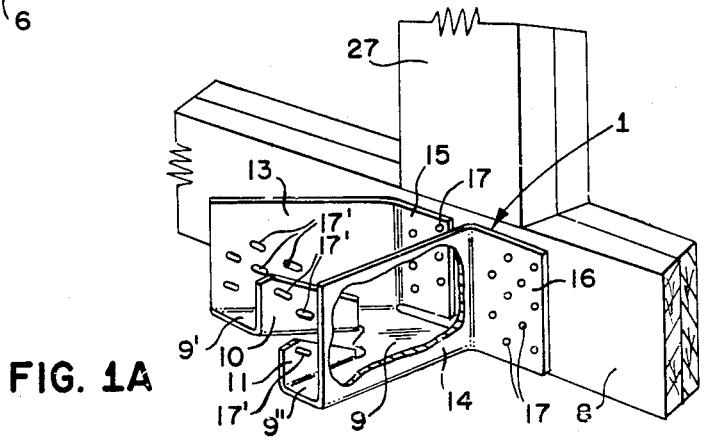
FIG. 1A is another perspective view of the connector illustrated in FIG. 1 with a portion of the wall of the connector removed for illustrating portions of the connector not visible in FIG. 1.
Figure 4:
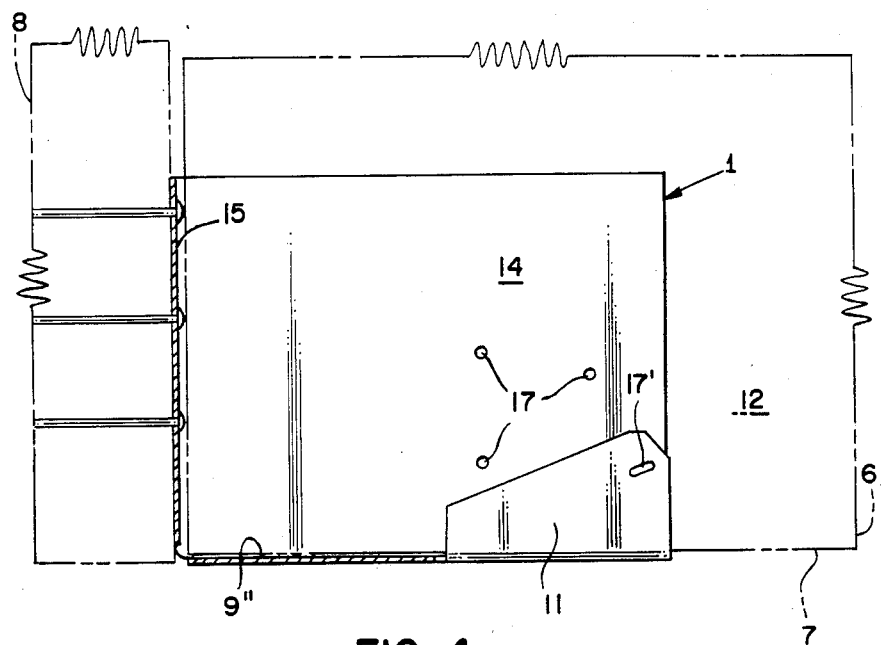
FIG. 4 is a side elevation view of the connector taken along line 4—4 of FIG. 2.
Figure 5:
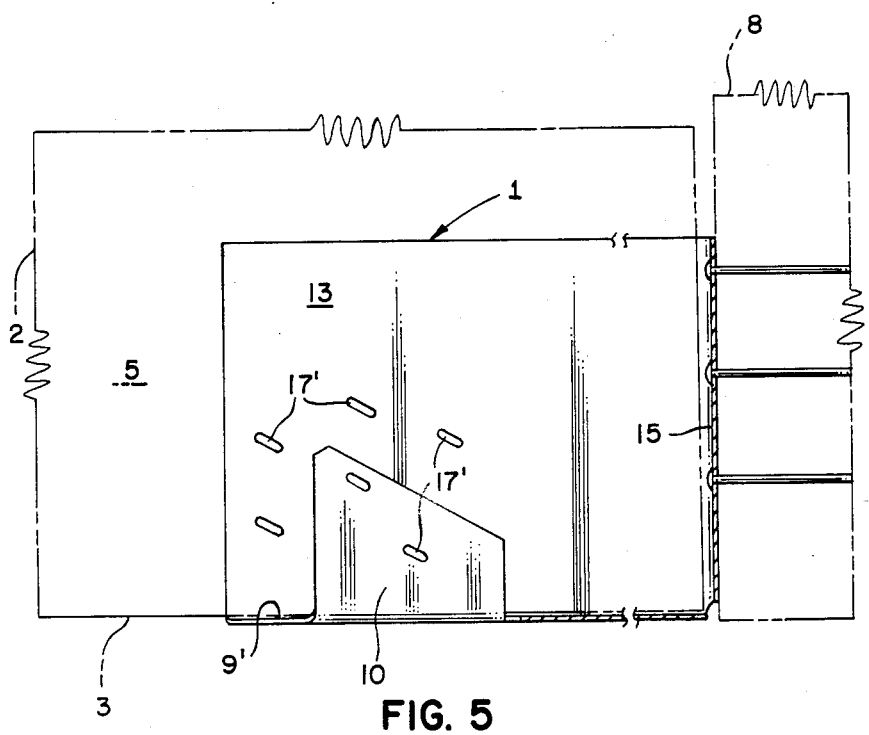
FIG. 5 is a side elevation view of the connector taken along line 5—5 of FIG. 2.

The present invention is a multiple wood truss connection including a wood hip truss 18 including a wood bottom chord 2 having a bottom edge 3 and parallel first and second sides 4 and 5 a wood jack truss 19 including a wood bottom chord 6 having a bottom edge 7 and parallel first and second sides 12 and 29 a wood carrier girder 20 including a wood bottom chord 8 disposed at an angle of about 90° to the jack truss 19 and less than 90° to the hip truss 18; a sheet metal connector including a seat member 9 adapted for receiving the bottom edges 3 and 7 of the wood bottom chords 2 and 6 to the wood hip truss 18 and the wood jack truss 19; a first tab member 10 connected to the seat member 9 and extending angularly upwardly therefrom for registration with the second side 5 of the wood bottom chord 2 of the wood hip truss 18; a second tab member 11 connected to the seat member 9 and extending angularly upwardly therefrom for registration with the first side 12 of the wood bottom chord 6 of the wood jack truss 19; a first sidewall member 13 spaced from the first tab member 10 and connected to the seat member 9 and extending upwardly therefrom parallel to the first tab member 10 for registration with the first side 4 of the wood bottom chord 2 of the wood hip truss 18; a second sidewall member 14 spaced from the second tab member 11 and extending upwardly therefrom parallel to the second tab member 11 for registration with the second sidewall 29 of the wood bottom chord 6 of the wood jack truss 19; a first backwall member 15 connected to the first sidewall member 13 and extending at an angle thereto along a first bend line 23 and forming a substantial section of metal providing vertical shear resistance along the first bend line 23 and the first back wall 15 is connected to the bottom chord 8 of the wood carrier girder; a second backwall member 16 connected to the second sidewall member 14 and extending at an angle thereto along a second bend line 24 and providing vertical shear resistance along the second bend line 24 and said second back wall member 16 is connected to said bottom chord of said wood girder 20 and in the same plane as the first backwall member 15; fastener openings 17 formed in the first and second tab members 10 and 11, the first and second sidewall members 13 and 14 and the first and second backwall members 15 and 16 dimensioned for receipt of fasteners therethrough; and fastener means respectively connecting the first sidewall member 13 and the first tab member 10 to the wood hip truss 18 and the second side wall member 14 and the second tap member 11 to the jack truss 19, and the first and second back wall members 15 and 16 to the carrier girder 20.

The present invention is especially suited for wood truss construction and as shown in the drawings the connector 1 is particularly suited for connecting a hip truss 18 and a jack truss 19 to a carrier girder 20. As illustrated in FIGS. 1 and 2, the connector 1 is connected to a first wood member 2 which in this case is the bottom chord of hip truss 18; a second wood member 6 which in this case is the bottom chord of jack truss 19; and carrier wood member 8 which in this case is a girder truss 20. In most cases, the girder truss 20 will be a double girder 20 and 20' as shown.

While the fist backwall member 15 theoretically could be angled away from the second backwall member 16, the preferred construction is to angle the first backwall member 15 toward the second backwall member 16. This construction accomplishes two purposes. First, it is easier to nail the first backwall member 15 to the carrier wood member 8, and secondly, this construction places the first backwall 15 closer to the location of the load on the second wood member 6 and the first wood member 2.

Because of the angles at which the the wood members intersect, driving nails through the connector at right angles is difficult or impossible. For this reason, the fastener openings 17' formed in the first and second tab members 10 and 11 and the first sidewall member 13 are elongated so as to permit fasteners to be driven at an angle less than 90° to the faces of the first and second tab members and the first sidewall member.

As an example of a truss hip/jack connector 1 as described, the details of construction are as follows. The blank may be formed from 14 gauge galvanized steel. It is to be further understood that the connector illustrated in the drawings is a hip skewed 45° left, but a 45° right may be made in a similar manner except that the hip member would skew to the right instead of the left as shown.

The connector may have a height of 5 3/16' and the seats for the hip and jack member may have a width of 1 158'. The seat for the hip member may be 5' in length and the seat for the jack member may be 6 ¾' in length. The angle between the seats for the hip and jack member may be 45° as shown in the illustrations.

A connector as described above has an allowable uplift load for the hip truss of 1025 pounds, a normal load of 1,610 pounds and a maximum allowable down load of 1,915 pounds. For the jack truss, the connector described has allowable loads of 340 pounds uplift, 535 pounds normal down and 635 maximum down loading.

Figure 6:
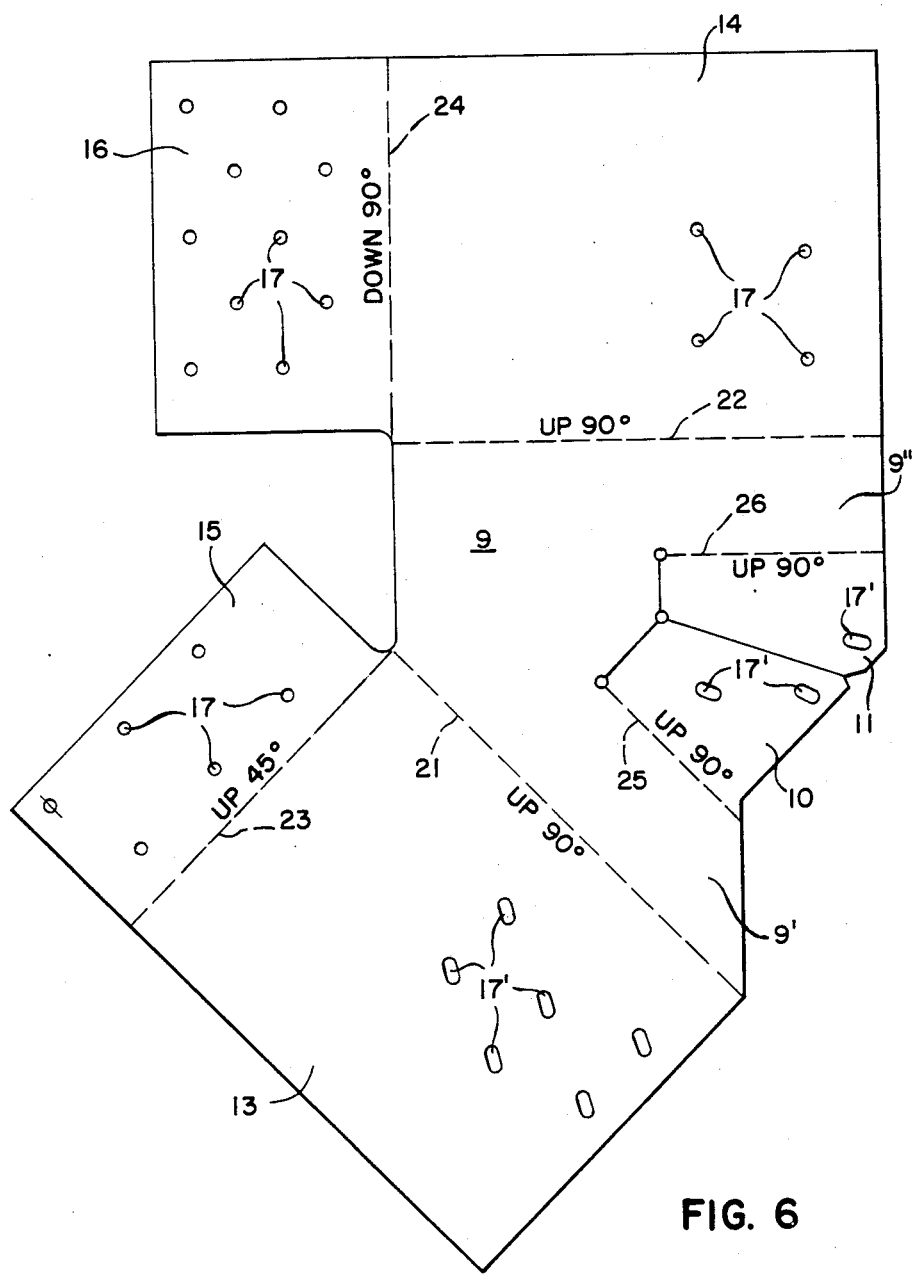
FIG. 6 is a plan view of the sheet metal blank from which the connector of the present invention is constructed.

A connector 1 may be constructed from a sheet metal blank as shown in FIG. 6. First sidewall member 13 is bent upwardly at an angle of 90° along bend line 21 bordering the hip seat 9'. Second sidewall member 14 is bent upwardly along bend line 22 bordering jack seat 9" at an angle of 90°. First backwall member 15 is bent up at an angle of 45° along bend line 23 bordering first sidewall member 13. Second backwall member 16 is bent down along bend line 24 bordering second sidewall member 14 at an angle of 90°. First tab member 10 is bent upwardly along bend line 25 bordering hip seat 9' at an angle of 90°. Second tab member 11 is bent upwardly along bend line 26 bordering jack seat 9" at an angle of 90°.

A suggested installation procedure is as follows. The connector is first attached to the bottom chord of the girder truss 20 which preferably is a double girder truss by first lining up first backwall member on the king post 27 of the carrier girder truss 20 and inserting nails through openings 17 into carrier wood member 8. Next nails may be driven through nail openings 17 in second backwall member into the bottom carrier wood member 8. In most instances, the hip truss 18 will be first seated on its seat 9' and nails driven through slotted openings 17' in first side member 13 and first tab member 10. Finally, jack truss 19 is placed on jack seat 9" and nails driven through openings 17 in second sidewall member 14 and slotted openings 17" in second tab member 11. Where a nailing plate occurs behind the nail openings in the connector, the nails are driven through the thin gauge nailing plate; even when the nails are to be driven at an angle.

I claim:
1. In a multiple wood truss connection comprising:
   a. a wood hip truss including a wood bottom chord having a bottom edge and parallel first and second sides;
   b. a wood jack truss including a wood bottom chord having a bottom edge and parallel first and second sides;
   c. a wood carrier girder including a wood bottom chord disposed at an angle of about 90° to said jack truss and less than 90° to said hip truss;
   d. a sheet metal connector including:
      1. a seat member adapted for receiving said bottom edges of said wood bottom chords of said wood hip truss and said wood jack truss;
      2. a first tab member connected to said seat member and extending angularly upwardly therefrom for registration with said second side of said wood bottom chord of said wood hip truss;
      3. a second tab member connected to said seat member and extending angularly upwardly therefrom for registration with said first side of said wood bottom chord of said wood jack truss;
      4. a first sidewall member spaced from said first tab member and connected to said seat member and extending upwardly therefrom parallel to said first tab member for registration with said first side of said wood bottom chord of said wood hip truss;
      5. a second sidewall member spaced from said second tab member and extending upwardly therefrom parallel to said second tab member for registration with said second side of said wood bottom chord of said wood jack truss;
      6. a first backwall member connected to said first sidewall member and extending at an angle thereto along a first bend line and forming a substantial section of metal providing vertical shear resistance along said first bend line and first back wall is connected to said bottom chord of said wood carrier girder;
      7. a second backwall member connected to said second sidewall member and extending at an angle thereto along a second bend line and providing vertical shear resistance along said second bend line and said second back wall member is connected to said bottom chord of said wood girder and in the same plane as said first backwall member;
      8. fastener openings formed in said first and second tab members, said first and second sidewall members and said first and second backwall members dimensioned for receipt of fasteners therethrough; and
      9. fastener means respectively connecting said first sidewall member and said first tab member to said wood hip truss, said second sidewall member and said second tab member to said jack truss, and said first and second backwall members to said carrier girder.
2. In a multiple wood truss connection as desribed in claim 1 wherein:
   a. said fastener opening formed in said first and second tab members and said first sidewall member are elongated so as to permit fasteners to be driven at an angle less than 90° to the faces of said first and second tab members and said first sidewall member.

* * * * *

UNITED STATES PATENT AND TRADEMARK OFFICE
CERTIFICATE OF CORRECTION

PATENT NO. : 4,817,359
DATED : April 4, 1989
INVENTOR(S) : Karen W. Colonias

It is certified that error appears in the above-identified patent and that said Letters Patent is hereby corrected as shown below:

Column 1, line 8, after "girder" delete ---connected to a header member---.
Column 2, line 17, change the word "to" to ---of---.
Column 3, line 27, change "5 3/16'" to ---5 3/16"---.
Column 3, line 29, change "1 158'" to ---1 5/8"---.
Column 3, line 29, change "5'" to ---5"---.
Column 3, line 30, change "6 3/4'" to --- 6 3/4"---.

Signed and Sealed this

Thirty-first Day of October, 1989

Attest:

DONALD J. QUIGG

Attesting Officer    Commissioner of Patents and Trademarks